June 11, 1963  C. D. SNELLING  3,093,308
METHOD AND MEANS FOR CONTROLLABLY RELEASING
HEAT FROM SUPER-COOLED LIQUIDS
Filed May 16, 1961  2 Sheets-Sheet 2

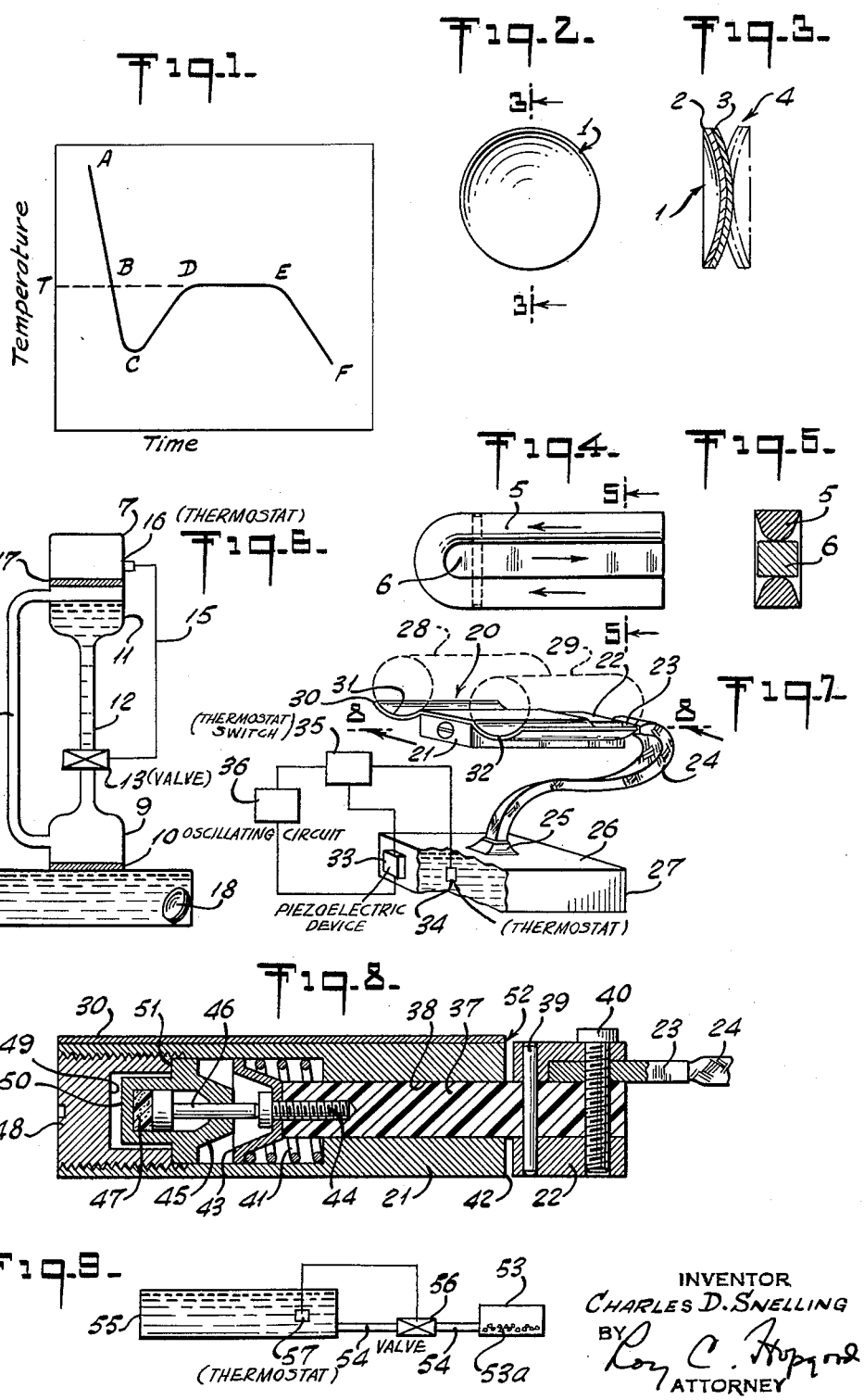

INVENTOR
CHARLES D. SNELLING
BY
Roy C. Hopgood
ATTORNEY

United States Patent Office 3,093,308
Patented June 11, 1963

3,093,308
METHOD AND MEANS FOR CONTROLLABLY
RELEASING HEAT FROM SUPER-COOLED
LIQUIDS
Charles D. Snelling, Breinigsville, Pa.
Filed May 16, 1961, Ser. No. 110,511
15 Claims. (Cl. 236—1)

This invention relates to a self-regulating temperature control system and, in particular, to a method and apparatus for controllably utilizing and relasing heat from a super-coolable liquid as a source of heat energy in regulating the temperature of a temperature-sensitive object subject to the adverse influence of an outside environment characterized by a wide variation in ambient temperatures.

Extremely delicate instruments, such as precision gyroscopes, velocity meters, and the like, are generally adversely affected by variations in ambient temperatures. Where these or similar instruments are employed as an essential part of an instrument package for use in devices subject to the influence of fluctuating ambient temperatures or in devices adapted to obtain scientific information of a particular environment, e.g., environmental probe devices, such instruments are generally standardized to a particular reference temperature. Unless extreme care is taken to maintain the delicate instrument as close as possible to its predetermined reference condition, or to insure compensation for any adverse effect of the ambient environment, the delicate instruments may be rendered ineffectual or the device containing the instruments rendered practically useless for its intended purpose.

Although attempts have been made to protect the instruments or maintain them at their predetermined reference conditions, generally such attempts have led to the introduction of rather complicated temperature control devices. As far as I am aware, no simple apparatus has been proposed capable of providing a self-regulating system within the instrument package itself, particularly a system which will maintain constant conditions for a day or two, or even for at least a week, such as might be required in a short-time environmental probe device.

It is the object of my invention to provide an apparatus and method for closely regulating the temperature of a temperature-sensitive object, such as a precision gyroscope or a velocity meter.

Another object is to provide a dependable temperature regulation unit light weight in its construction and versatile in its application for use in systems subject to a wide range of fluctuating ambient or environmental temperatures, for example, temperatures ranging from about $-200°$ F. to about $150°$ F.

Still another object is to provide as a preferred embodiment a temperature control system which is self-regulating over a substantially long period of time and which system does not require the external application of energy to maintain its regulating effect during the period of regulation.

A further object is to provide a self-regulating temperature system capable of regulating the temperature of a temperature-sensitive object to within closely held limits, such as within a few degrees, or even within $\pm 0.5°$ F. for a prolonged period of time, for example, for at least a week.

These and other objects will more clearly appear from the following description and the appended drawings, wherein:

FIG. 1 is a typical cooling curve of a super-coolable liquid;

FIGS. 2 to 5 are illustrative of triggering devices adapted to promote the solidification of super-cooled liquids;

FIGS. 6 and 7 depict two types of a temperature control system which may be employed in carrying out the invention;

FIG. 8 is an enlarged cross-section of the heat valve element shown in FIG. 7 as viewed along line 8—8 indicated on the figure;

FIG. 9 depicts a trigger device for inoculating a super-cooled liquid with seed crystals.

Figure 10:
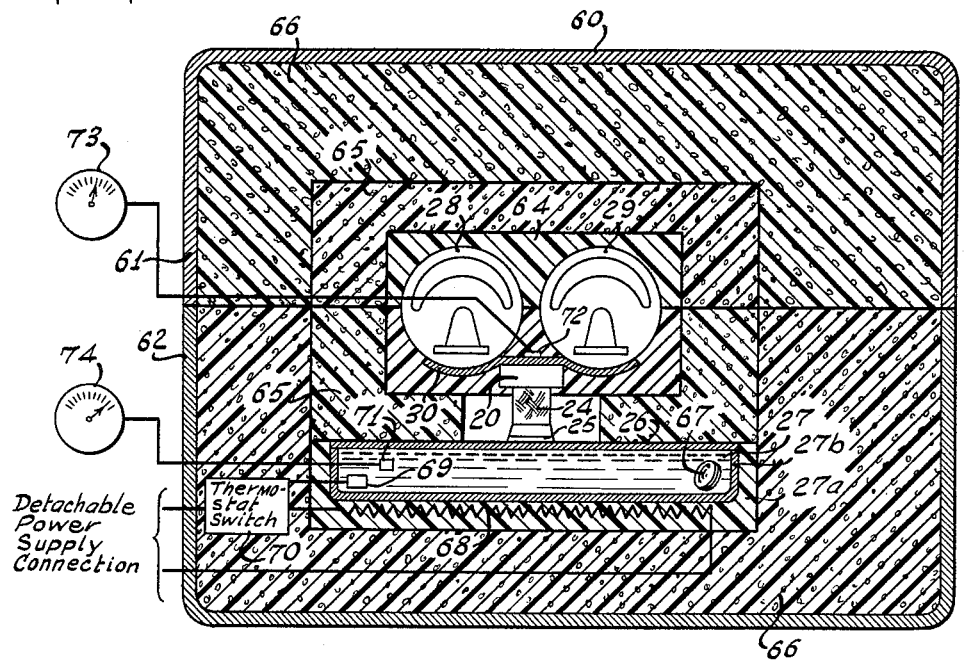
FIGS. 10 and 11 show substantially in cross-section the front and side elevation of an instrument package provided by the invention.

In my co-pending applications Serial No. 89,530 filed February 15, 1961, and Serial No. 110,510 filed May 16, 1961, I provide, as an embodiment, a self-regulating system for controlling the temperature of a temperature-sensitive object in which I make provision for a built-in source of heat energy in the form of a heat reservoir and draw on that energy from time to time when it is needed to compensate for any temperature drop of the object because of heat loss to the ambient environment. Broadly speaking, in setting up the system, I insulate the object from the ambient environment under substantially adiabatic conditions, provide a bulit-in heat energy storage device or heat sink also similarly insulated from said environment and said object, provide a connectable path of heat flow between said object and said heat sink, cause a sensing signal to be produced corresponding to the temperature within the immediate environment of the object, connect said path of heat flow between between said obejct and said heat sink and vary the amount of heat flow along said path between said object and said heat sink in accordance with the sensing signal to maintain the temperature of the object at its predetermined level. In this way, I add just enough heat to make up for the slight loss through the insulation.

I have found that by utilizing a system under substantially adiabatic conditions, that is a system in which the heat loss to or heat gain from the ambient environment is kept to a minimum, I am able to provide a very simple self-regulating system capable of operating for a prolonged period of time without the external application or removal of heat energy during the regulating period, be it a day, several days, or for at least a week. By substantially adiabatic conditions, I have in mind heat energy systems in which, at worst, the rate of temperature drop of the temperature-sensitive object is maintained by means of insulation below one-half degree F. per minute and preferably below one-quarter degree F. per minute over ambient temperatures fluctuating within the somewhat extreme range of about $-200°$ F. to $150°$ F. Generally speaking, under the conditions in which my system normally works, the adiabatic condition is such that the temperature drop or gain does not exceed more than 1 or $2°$ F. per hour. Under such conditions, I am able to maintain the temperature constant for an extended period of time.

The connectable path of heat flow between the heat reservoir and the temperature-sensitive object may comprise several embodiments. In one embodiment, heat flow to the object when required is achieved by associating an evaporator in heat conductive relationship with the heat reservoir, a condenser in heat conductive relationship with sensitive object and fluid-conducting means adapted via valve means to be conductively coupled to said condenser and to said evaporator. Fluid in the system is heated in the evaporator and the vapor thereof conducted to the condenser where it condenses and transfers heat to the object. The amount of heat transferred is controlled by a temperature-sensing means associated with the object which actuates the valve means which sets up the path of heat flow via said fluid circuit between the object and the heat reservoir.

In another embodiment, the heat flow from the heat reservoir to the object may be achieved through a flexible metal conductor of high heat conductivity, e.g., strands of woven copper wire, which couples the heat reservoir to the sensitive object through a thermostatically controllable metal heat valve adapted to make or break the heat flow to the object. The heat valve is controlled by means of a temperature-sensing element which opens and closes the valve connection according to the temperature of the object.

In providing a system which will operate for a prolonged period of time, a built-in heat source is employed in which the heat available to do the desired work is derived from the heat of solidification of a chemical liquid, e.g., a molten chemical compound or a saturated solution of a salt in water or other solvent which releases additional heat when the salt crystallizes out. However, some salts or compounds in the molten state or as saturated solutions have the tendency of super-cooling below their solidification or crystallization temperature. Examples of hydrated compounds which in the molten state tend to supercool to below the freezing point are sodium acetate ($NaC_2H_3O_2 \cdot 3H_2O$) which melts at about 135° F., lead acetate ($Pb(C_2H_3O_2)_2 \cdot 3H_2O$) which melts at about 167° F., and sodium thiosulfate known commercially as "hypo" ($Na_2S_2O_3 \cdot 5H_2O$) which melts at about 118° F. and exhibits a latent heat of fusion of about 86 B.t.u./lb.

An example of a compound which as a saturated solution super-cools readily below the temperature of crystallization is anhydrous sodium acetate dissolved in water to the extent of about 60% by weight of anhydrous sodium acetate.

A cooling curve typical of the foregoing compounds is illustrated by FIG. 1 in which the portion BCD represents the phenomenon of undercooling. During cooling, the liquid follows the usual cooling curve AB down past the temperature T, which is its proper freezing or crystallization temperature without the appearance of any solid. When solidification or crystallization begins, a large quantity of the liquid changes its state at once and the temperature immediately rises from the level of C to D on the line BE, the true solidification temperature. The rise in temperature is due to the liberation of latent heat, from the form of potential energy in the liquid to kinetic energy in the solid. The appearance of the solid is, of course, desirable where additional heat energy is required for the system.

In carrying out my invention, I am able to use the foregoing type of heat storage materials to great advantage in that besides utilizing the sensible heat in the material available from, for example, A to the super-cooled region designated by C as shown in FIG. 1, I am also able through triggering devices to initiate the immediate conversion of the potential energy to kinetic energy (DE on the curve) and the release thereof for use in the system. Triggering devices which may be employed include a Spencer disc, a bi-metal device which is adapted to snap violently in the bath at a desired slightly super-cool temperature before substantial super-cooling takes place to promote solidification; a thermostatically controlled needle which scrapes, rubs or slides against a hard surface, e.g., a ground glass surface, in the bath to promote nucleation of the material and hence solidification of the liquid; a vibrator of the piezoelectric type which is adapted at a supporting surface to generate a plurality of shock waves which promote solidification; or a device which enables the automatic seeding of the bath with a crystal of the substance to provide the immediate solidification thereof.

FIG. 2 is illustrative of a concaved bi-metal Spencer disc 1 formed of two dissimilar metals 2 and 3 (note FIG. 3) adapted to snap violently into position 4 on cooling to a lower temperature, by virtue of the coefficient of contraction of metal 3 being greater than that for metal 2. FIG. 4 is a device comprising rubbing elements 5 and 6 (note FIG. 5) adapted to move relative to each other when the temperature of the liquid drops to a particular level, the rubbing of the elements being such as to promote crystallization in the liquid; the elements 5—6 are shown pinned to each other at one end, thereby providing a fixed reference for the relative movement of their other ends, in the course of a temperature cycle.

Figure 11:
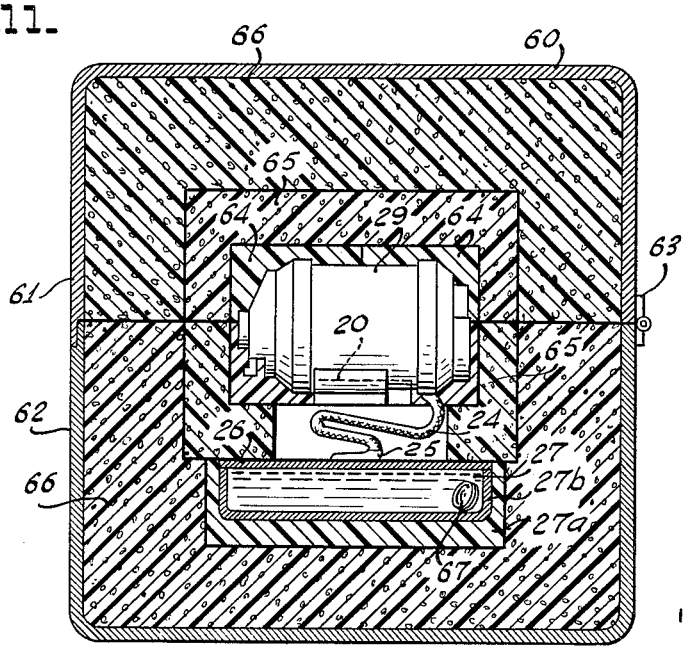

As illustrative of one embodiment of the invention, reference is made to FIG. 6 which shows a temperature control system which would normally be packed within an insulated instrument package as illustrated in FIGS. 10 and 11. The system comprises a temperature-sensitive object (not shown) confined within a container 7 completely surrounded and supported by insulation (not shown) of plastic foam, such as urethane foam of very low heat conductivity. Spacially associated with the object is a heat sink 8 at a temperature higher than that of the object containing a saturated sodium acetate solution (about 60% by weight sodium acetate) whose heat content is substantially higher than that of the object. Immersed in the solution is a Spencer disc 18 adapted to snap violently when a particular slightly super-cool temperature is reached. In association with the object and the heat sink is provided a fluid heat transfer system comprising an evaporator 9 in heat conductive contact with the heat sink via metal interface 10, for example, copper, said evaporator being connectably coupled to condenser 11 via a flexible hermetically sealed fluid return tube 12 of copper, rubber, neoprene, polyethylene or other material under conditions of relatively poor heat conductivity through a controlled valve release 13 and through heat transfer tube 14 also of polyethylene or other material employed under conditions of relatively poor heat conductivity. Condenser 11 contains a heat transfer fluid, for example, a refrigerant, preferably Freon 11 or 113. A temperature-sensing device is sometimes provided indicated generally by dotted lines 15, or the device may be pressure sensitive as affected by temperature change, the sensing portion 16 of the device being located in one embodiment at the interface of container 7 and the plastic foam packed next to it, the control portion being associated with conventional means at valve 13 for opening and closing said valve when the temperature of the object varies from its standard reference temperature. The means for actuating the valve may be any standard device normally used for that purpose such as a bulb or bellows controlled valve, a means which reacts to the change in vapor pressure of the heat transfer fluid, or an element capable of expanding or contracting in response to heat change, such as a wax pellet, or in short any device having thermostatic properties.

The container 7 of the object is in heat conductive contact with condenser 11 at interface 17, preferably of copper, or other material of good heat conductivity, in order to insure immediate heat transfer to the object in controlling the temperature thereof. In setting up the system to maintain a given constant temperature for the object, I provide a hermetically sealed heat transfer fluid system evacuated to a convenient pressure corresponding to a desired operating temperature, for example, corresponding to the temperature of the object. A given amount of the liquid would be inserted hermetically in condenser 11 with valve 13 closed and then evacuated to a desired pressure. I then provide a heat sink with a temperature higher than that of the object spacially related to the object as shown in FIG. 6. The system is well insulated along the lines shown in FIGS. 10 and 11 with material of low heat conductivity, preferably urethane foam having a density in the neighborhood of about 2 lbs./cu. ft. I find for my purposes and under the conditions my system is generally adapted to operate that the object as well as the heat source may be insulated from the ambient environment by an insulation thickness of about 2 to 8 inches or greater in providing a substan- Assuming that the temperature sensing device is set to detect a temperature drop of 0.5° F. and greater and the temperature has dropped, let us say several degrees, the valve is actuated by sensing device 15 to release liquid into evaporator 9 where it immediately flashes into a vapor, absorbs heat from the heat sink, leaves the evaporator through heat transfer tube 14, condenses in condenser 11 to release its heat of vaporization, which heat is transferred via metal interface 17 to container 7 and to the instrument until the temperature at 16 reaches the desired object temperature following which the valve is closed automatically. Since no more liquid is fed to evaporator 9, heat transfer to the object ceases until additional heat is called for, whereby the cycle is repeated. Actually, the system tends to modulate and will establish an equilibrium condition appropriate to the heat flow rate called for.

As the saturated sodium acetate solution in heat sink 8 gives off its sensible heat via the heat transfer fluid to the object, the cooling thereof follows the typical curve shown in FIG. 1. As the solution super-cools to the region of valley of the curve (note C on FIG. 1), Spencer disc 18 snaps violently and transmits sufficient shock to the solution to cause the sodium acetate to crystallize out immediately and give off latent heat as indicated by a rise in temperature to plateau DE on the curve, thus making available additional heat for regulating the temperature of the object.

In using super-coolable liquids, care must be taken to produce such liquids from pure ingredients, otherwise the presence of contaminants tends to inhibit super-cooling, whereby the liquid behaves like conventional liquids on cooling. In most cases, however, where little or no super-cooling is desired, the presence of certain impurities is not objectionable and may even be desired.

Various types of heat transfer fluids may be employed in carrying out the embodiment of FIG. 6. Examples of heat transfer fluids together with the heats of vaporization which may be employed in carrying out the invention are given in the following table:

| Name | Formula | Temp., °F. | Heat of vaporization, B.t.u./lb. |
|---|---|---|---|
| Acetone | $(CH_3)_2CO$ | 133.5 | 225 |
| Benzene | $C_6H_6$ | 176.0 | 170 |
| Carbon Tetrachloride | $CCl_4$ | 170.0 | 83 |
| Ethyl Alcohol | $C_2H_5OH$ | 173.0 | 366 |
| Ethyl Ether | $(C_2H_5)_2O$ | 94.5 | 150 |
| Freon 11 | $CCl_3F$ | 75.3 | 78 |
| Freon 113 | $CCl_2F-CClF_2$ | 117.6 | 63 |

Of course, it will be appreciated that these heat transfer fluids are not limited in use to the temperature indicated since they can be adapted for any desired temperature in accordance with the pressure prevailing within the hermetically sealed heat transfer device.

Another embodiment of my invention using a piezoelectric crystal as a shocking device is depicted in FIG. 7 which shows the cooperable elements of another temperature-control system without the insulation for purposes of clarity of the type contained in the instrument package illustrated in FIGS. 10 and 11.

FIG. 7 shows a thermostatically controllable metal block or heat valve designated generally by the numeral 20 (also note FIG. 8) comprising a forward or first block portion 21, preferably of aluminum, and a rearward or second block portion 22, preferably of copper. The second block portion 22 is connected to said first portion via a heat insulative means (to be described later) slidably associated with the interior of the first block portion whereby said second block portion is adapted to be in contactable and heat conductable relationship with said first block portion. Second block portion 22 has a slot adapted to receive a heat conductive bus element portion 23, e.g., copper, connected to a plurality of strands of woven copper wire 24 which in turn are connected to another heat conductive bus element 25 connected by soldering or other means in heat conductive relationship with heat conductive surface 26 of heat sink 27. Thus, heat will flow from heat sink 27 through bus element 25, through the woven strands of copper or other heat conductive metal 24 to heat conductive bus element 23 and then to the second block portion 22. If block portion 22 is in heat conductive contact with block portion 21, then heat will flow into portion 21.

In use, heat valve 20 would be in close association with sensitive objects 28, 29 indicated in dotted line whose temperature is to be controlled. In one embodiment the close association may be achieved by means of a heat conductive support 30, such as a copper plate, joined in intimate heat conductive relationship with the heat valve 20 via screws (not shown) or other fastening means, the copper plate being configurated in this instance with a pair of slightly cylindrically curved wings 31 and 32 adapted to hold the two cylindrically shaped temperature-sensitive objects 28 and 29, for example, two gyroscopes (note FIG. 10). By using a flexible heat conductive means, such as strands of copper wire 24, I am enabled to pack the elements making up the device substantially completely within a resilient insulation material, such as urethane plastic foam (note FIGS. 10 and 11). Since the elements are not connected into a rigid structure and since the wire is flexible, the delicate temperature-sensitive object may be cushioned to resist extraneous mechanical vibration. The thickness of insulation surrounding the elements of the device should be at least sufficient to insure substantially adiabatic conditions.

In obtaining the available heat energy from the super-coolable liquid making up heat sink 27, I provide a piezoelectric crystal triggering device 33 attached to a face of the heat sink actuated thermostatically via a thermostatic sensing element 34 in the liquid coupled to a thermostat switch 35 which couples a circuit 36 containing an oscillating current to the piezoelectric device when the liquid has super-cooled to a temperature below the solidification temperature. The vibrations emitted by the crystal set up shock waves in the liquid which brings about solidification followed by a further release of heat.

In the embodiment shown in FIG. 7, the heat valve or metal block 20 together with the heat conductive support 30 is thermostatically controllable to a particular reference temperature by temperature-control means associated with the valve. This will be clearly apparent by referring to FIG. 8 which is an enlarged cross-section taken along line 8—8 of FIG. 7. The valve is shown comprising first block portion 21 having associated in contactable and heat conductive relationship therewith second block portion 22 connected to said first block portion via heat insulative rod 37 of fiber-reinforced phenolic resin, or other suitable heat insulative material, which is slidably mounted within cylindrical bore 38 of block portion 21 but integral with block portion 22 by means of pin 39 as well as set screw 40 which is also adapted to fasten heat conductive bus element 23. Rod 37 has associated with it biasing spring 41 which together with other associated elements is adapted to maintain block portion 21 in heat conductive relationship with block portion 22 along parting face 42 of block portion 21. The contacting faces of each portion must be precisioned machined and polished flat and be free from tool marks to insure good surface contact.

Biasing spring 41 is held in position by flanged cupped retainer 43, which retainer is connected to the end portion of rod 37 via screw 44. The tendency for the spring is to expand and maintain the two block portions in heat conductive contact at parting face 42.

Against the well of retainer 43 is disposed one end of a thermostatic element 45 having a piston and rod combination 46 adapted to be pressed up against the head of screw 44 in the well of retainer 43. The cylinder behind the piston head of piston and rod 46 contains a thermally sensitive wax composition 47 adapted to undergo change in volume with changes in temperature. To keep the contained elements in cooperable relationship, a threaded plug 48 is provided at one end of block portion 21. The plug has a blind hole 49 for receiving head 50 of thermostatic element 45. The plug is designed so that it presses against flange 51 of thermostatic element 45, with rod 46 in turn pressing against screw 44 in the well of retainer 43. The amount of pressure applied by the turn of the plug will depend upon the particular setting required for a particular reference temperature.

Assuming that heat valve 20 has been set so that the block portion 21 is in heat conductive relationship with block portion 22 along contact face 42, and that the temperature of the sensitive object resting on heat conductive support 30 has exceeded its standard reference temperature and that the temperature of the parts of block 21 is in equilibrium with the sensitive object, wax 47 will expand, push piston rod 46 against insulating rod 37 in opposition to biasing spring 41, thereby causing block portion 22 to separate from block portion 21, leaving a non-conductive space 52 as shown in FIG. 8. The block will be rendered substantially non-heat conductive until the temperature of the sensitive object and its support 30 drops to below its standard reference temperature, whereby wax composition 47 contracts and biasing spring 41 returns insulating rod 37 to its home position to bring the two blocks in heat conductive relationship at contact face 42. Thus, in addition to the controls provided in releasing heat energy from a super-coolable liquid, controls are also cooperably provided for controlling the flow of the released heat energy to the temperature-sensitive object.

In FIG. 9, another device is shown for triggering the solidification or crystallization of a super-coolable liquid. Assuming the liquid to be a saturated solution of sodium acetate in water, seed crystals of the salt 53a are provided in a container 53 coupled via a flexible polyethylene tube or similar conduit 54 to heat sink 55 containing the solution via a releasable valve 56 thermostatically controlled by sensing element 57 which, when a specified super-cooled temperature is reached, causes valve 56 to open by means associated therewith. Liquid flowing through tube 54 contacts seed crystals 53a which inoculate the liquid and promote the immediate crystallization thereof.

An instrument package incorporating one of the embodiments of the invention is shown in FIGS. 10 and 11. The figures depict in cross-section, except for the temperature-sensitive objects which are not sectioned, the various elements making up the package comprising outer casing 60 of metal, wood, plastic, or the like, formed of two halves 61 and 62, hinged at 63 and showing packed within it a heat conductive block or valve 20 of FIGS. 7 and 8 supported by resilient urethane foam plastic. Connected to the valve is heat conductive support 30 in heat conductive relationship with a pair of gyroscopes 28 and 29 which are snugly packed in and surrounded by urethane foam segments 64. These segments are further surrounded by urethane foam segments 65 which in turn are surrounded and supported by additional urethane foam 66. Thus, a vibration resistant package is provided as well as one which is substantially adiabatically insulated from the ambient environment.

Flexible strands of copper wire 24 extend from valve 20 and are connected to heat conductive surface 26 of heat sink 27 via heat conductive bus element 25 of copper. Heat sink 27 is spacially associated with the sensitive objects but sufficiently insulated therefrom to maintain substantially adiabatic conditions. The heat sink is preferably formed as a thermos vessel with an outer wall 27a of insulating material and an inner wall 27b of heat conductive metal to insure flow of heat to heat conductive surface 26 of the heat sink. The heat source is preferably a supersaturated solution of a super-coolable liquid having a relatively high heat of solidification or crystallization, e.g., sodium acetate solution. A Spencer disc 67 is provided in the liquid of the type shown in FIGS. 2 and 3, as a triggering device for promoting the crystallization of the solution after the supercooling thereof.

In certain instances, a situation may arise wherein the heat in the heat storage device with the instrument package spends itself before or even after the device has been put into use. Therefore, as a preferred embodiment, I may provide a thermostatically controlled heat charging means of, for example, the type shown schematically in FIG. 10 comprising an electric heating element 68 in heat conductive relationship with heat sink 27, the heating element being connected to a detachable power supply source outside the package. A thermostat-sensing element 69 would be provided in the heat storage region 27 in cooperative relationship with thermostat 70 for actuating said heating elements when the temperature of the material in the heat storage device drops below a particular value in the solid state. Additional thermostat-sensing elements 71 and 72 also may be provided in heat storage device 27 and in heated region near heat valve 20, respectively, so that the instantaneous condition of the vital parts of the container may be continuously monitored on dials 73 and 74 on one of the outside faces of the instrument package. When the material has been reheated to the desired temperature, the Spencer disc will reset itself due to the temperature change and be ready for the next cycle of heating. Of course, it will be appreciated that numerous and multiple ways may be provided for applying heat to the heat storage device. For example, a hermetically sealed unit may be employed comprising an arrangement of tubing conducting hot water or stream vapor heated by a built-in Calrod unit detachably connectable to an outside power source.

The insulation which may be employed in maintaining the system as close to adiabatic as possible may be one whose heat conductivity in British units ranges up to about 0.5 B.t.u./hr./sq. ft./° F./in. or from 0.2 to 0.5. As has been stated, I prefer to use urethane plastic foam which comes in various densities ranging from about 1 to 20 lbs. per cubic foot, e.g., 2 lbs./cu. ft., with heat conductivities varying with density up to about 0.3 B.t.u./hr./sq. ft./° F./in. I have found that foams of very low density, e.g., as low as 2 lbs./cu. ft., and of heat conductivities in the neighborhood of about 0.2 to be very useful in carrying out my invention. For my purposes, urethane foam materials are particularly adaptable as they can be foamed in place whereby to provide a vibration-resistant support for the temperature control system. Vinyl foams may also be employed. Certain other insulating materials of rather low heat conductivity may be used, such as cotton wool ($K=0.136$), hair felt ($K=0.36$), mineral wood ($K=0.27$) and the like, not to mention cork, santacel, glass wool, etc.

As has been stated, the metals making up the heat conductive metal block may include such high heat conductive metals as aluminum and copper. I prefer the flexible heat conductor associated with the metal block to be made of copper. Of course, any heat conductive metal may be employed having heat conductivities referred to copper of at least about 0.1, it being understood that the smaller the fraction, the less effective the speed of heat transmission will be.

When insulating the temperature-sensitive object, it is desirable that the temperature of the insulation and the heat conductive block initially be very close and preferably equal to that of the object. In this way, I am able to start with a system that is initially adiabatic in principle so that the object will not be subject to any rapid falling off in temperature, particularly where the insulation is at least thick enough to inhibit a rapid loss in heat content.

The term "solidification" employed herein as applied to the liquid in the reservoir is meant to cover freezing of a molten salt or the crystallization of a salt from a saturated solution.

While the present invention has been described in conjunction with a preferred embodiment, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In a device for controlling the release of latent heat from a super-coolable chemical bath combination comprising, a reservoir comprised of said super-coolable bath and temperature-sensing means associated with said bath including trigger means associated with said temperature-sensing means for promoting the solidification of said bath at a predetermined slightly super-cool temperature, said temperature-sensing means being adapted at said predetermined super-cool temperature to actuate said solidification promotion means.

2. The device of claim 1 wherein the solidification promoting means is a shocking device adapted to set up a shock wave in said chemical bath at a predetermined super-cool temperature.

3. The device of claim 1 wherein the solidification promoting means comprise at least a pair of elements which move in rubbing contact with respect to each other.

4. The device of claim 1 wherein the solidification promoting means include means having seed crystals associated therewith adapted to be contacted with said reservoir.

5. In a device for controlling the release of latent heat from a super-coolable chemical bath the combination comprising, a reservoir comprised of said super-coolable bath and temperature-sensing means associated with said bath comprising a Spencer disc for promoting the solidification of said bath at a predetermined slightly super-cool temperature, said temperature-sensing disc being adapted at said predetermined super-cool temperature to snap violently and set up a shock wave in said bath.

6. In a device for controlling the temperature of a temperature-sensitive object subject to the influence of fluctuating ambient temperature the combination including, a heat reservoir comprising a super-coolable chemical bath spacially related to and at a temperature greater than the object to be regulated, means insulating said object and said heat sink from each other and from said ambient temperature under substantially adiabatic conditions, heat transfer means adapted to be coupled to said heat reservoir and said temperature-sensitive object, means for coupling said heat transfer means, temperature-sensing means associated with said object for actuating said coupling means in accordance with the temperature at which it is desired to control said object, and temperature-sensing means associated with said bath including means associated with said temperature-sensing means for promoting the solidification of said bath when said bath has reached a predetermined super-cool temperature.

7. In a device for controlling the temperature of a temperature-sensitive object subject to the influence of fluctuating ambient temperature the combinaion including, a heat reservoir comprising a super-coolable chemical bath spacially related to and at a temperature greater than the object to be regulated, means insulating said object and said heat sink from each other and from said ambient temperature under substantially adiabatic conditions, heat transfer means adapted to be coupled to said heat reservoir and said temperature-sensitive object, means for coupling said heat transfer means, temperature-sensing means associated with said object for actuating said coupling means in accordance with the temperature at which it is desired to control said object, and temperature-sensing means associated with said bath including a Spencer disc for promoting the solidification of said bath when said bath has reached a predetermined slightly super-cool temperature at which said disc is adapted to snap violently.

8. In a device for controlling the temperature of a temperature-sensitive object subject to the influence of fluctuating ambient temperature the combination including, a heat reservoir comprising a super-coolable chemical bath spacially related to and at a temperature greater than that of the object to be regulated, means insulating said object and said heat reservoir from each other and from said ambient temperature under substantially adiabatic conditions, a fluid-conducting means for conducting a condensible vapor between said object and said heat reservoir in heat exchanging relationship therewith, means for coupling said fluid conducting means, temperature-sensing means in the region of said object for actuating said coupling means in accordance with the temperature at which it is desired to control said object, and temperature-sensing means associated with said bath including means associated with said temperature-sensing means for promoting the solidification of said bath when said bath has reached a predetermined slightly super-cool temperature.

9. In a device for controlling the temperature of a temperature-sensitive object subject to the influence of fluctuating ambient temperature the combination including, a heat reservoir comprising a super-coolable chemical bath spacially related to and at a temperature greater than the temperature of the object to be regulated, means insulating said object and said heat reservoir from each other and from said ambient temperature under substantially adiabatic conditions, an evaporator associated with said heat reservoir in heat conductive relationship therewith, a condenser associated with said object in heat conductive relation therewith, fluid-conducting means adapted to be coupled to said condenser and to said evaporator, means for coupling said fluid-conducting means, temperature-sensing means associated with said object for actuating said coupling means in accordance with the temperature at which it is desired to control said object, and temperature-sensing means, associated with said bath including means associated with said temperature-sensing means for promoting the solidification of said bath when said bath has reached a predetermined slight super-cool temperature.

10. In a device for controlling the temperature of a temperature-sensitive object subject to the influence of fluctuating ambient temperature the combination including, a heat reservoir comprising a super-coolable chemical bath spacially related to and at a temperature higher than that of the object to be regulated, means insulating said object and said heat reservoir from each other and from said ambient temperature under substantially adiabatic conditions, a metal heat conductor adapted to be coupled to said heat reservoir and said temperature-sensitive object, means for coupling said heat conductor, temperature-sensing means associated with said object for actuating said coupling means in accordance with the temperature at which it is desired to control said object, and temperature-sensing means associated with said bath including means associated with said temperature-sensing means for promoting the solidification of said bath when said bath has reached a predetermined slightly super-cool temperature.

11. In a device for controlling the temperature of a temperature-sensitive object subject to the influence of fluctuating ambient temperature the combination including, heat conductive means associated with said temperature-sensitive object, a heat reservoir comprising a super-coolable chemical bath spacially related to and at a temperature higher than that of the object to be regulated, means insulating said object and said heat reservoir from each other and from said ambient temperature under substantially adiabatic conditions, a thermostatically controllable heat conductive metal valve comprising a first metal block portion having movably associated therewith in contactable and heat conductable relationship a second metal block, coupling means for heat conductively coupling said first block portion to said second block portion, a flexible metal heat conductor connecting said second block portion in heat conductive relationship with said heat reservoir, means heat conductively connecting said first block portion to said heat conductive means associated with said temperature-sensitive object, temperature-sensing means associated with said heat conductive metal valve for actuating said black coupling means in accordance with the temperature at which it is desired to control said object, and temperature-sensing means associated with said bath including means associated with said temperature-sensing means for promoting the solidification of said bath when said bath has reached a predetermined slightly super-cool temperature.

12. An instrument package adapted with self-regulating temperature means for controlling the temperature of a temperature-sensitive object subject to the environmental influence of fluctuating ambient temperatures which comprises, a container having insulatedly packed therein a temperature-sensitive object and a heat reservoir containing a super-coolable chemical bath spacially related to said object and at a temperature greater than that of the object, the thickness of insulation in said package being at least sufficient to insulate said object and said heat reservoir from each other and from the ambient temperature under substantially adiabatic conditions, heat transfer means within said package adapted to be coupled to said object and said heat reservoir, means for coupling said heat transfer means, temperature-sensing means associated with said object for actuating said coupling means, and temperature-sensing means associated with said bath including means associated with said temperature-sensing means for promoting the solidification of said chemical bath and releasing the heat generated thereby when a predetermined slightly super-cool temperature of said bath has been reached.

13. An instrument package adapted with self-regulating temperature means for controlling the temperature of a temperature-sensitive object subject to the environmental influence of fluctuating ambient temperatures which comprises, a container having insulatedly packed therein a temperature-sensitive object and a heat reservoir containing a super-coolable chemical bath spacially related to said object and at a temperature greater than that of the object, the thickness of insulation in said package being at least sufficient to insulate said object and said heat sink from each other and from the ambient temperature under substantially adiabatic conditions, fluid-conducting means for conducting a condensible vapor between said object and said heat reservoir in heat exchanging relationship therewith, means for coupling said fluid-conducting means, temperature-sensing means associated with said object for actuating said coupling means, and temperature-sensing means associated with said bath including means associated with said temperature-sensing means for promoting the solidification of said chemical bath and releasing the heat generated thereby when a predetermined slightly super-cool temperature of said bath has been reached.

14. An instrument package adapted with self-regulating temperature means for controlling the temperature of a temperature-sensitive object subject to the environmental influence of fluctuating ambient temperatures which comprises, a container having insulatedly packed therein a temperature-sensitive object and a heat reservoir containing a super-coolable chemical bath spacially related to said object and at a temperature greater than that of the object, the thickness of insulation in said package being at least sufficient to insulate said object and said heat sink from each other and from the ambient temperature under substantially adiabatic conditions, a metal heat conductor within said package adapted to be coupled to said object and said heat reservoir, means for coupling said heat conductor, temperature-sensing means associated with said object for actuating said coupling means, and temperature-sensing means associated with said bath including means associated with said temperature-sensing means for promoting the solidification of said chemical bath and releasing the heat generated thereby when a predetermined slightly super-cool temperature of said bath has been reached.

15. A method of controlling the temperature of a temperature-sensitive object subject to the environmental influence of fluctuating ambient temperatures by maintaining the object temperature at substantially a predetermined temperature level which comprises, maintaining said object insulated from said ambient environment under substantially adiabatic conditions, providing a heat reservoir also insulated from said ambient environment and said object under similar conditions, said heat reservoir comprising a super-coolable chemical bath at a temperature greater than the temperature of the sensitive object, providing a connectable path of heat flow between said object and said heat reservoir, continuously producing a sensing signal corresponding to the temperature within the immediate environment of the object, connectably varying the amount of heat flow between said object and said heat reservoir in accordance with the sensing signal to maintain the temperature of the object at said predetermined level as the bath super cools to a temperature below its solidifying temperature, and then promoting the solidification of said bath when a predetermined slightly super-cool temperature of the bath has been reached, to release additional heat when required for transfer to the temperature-sensitive object.

References Cited in the file of this patent

UNITED STATES PATENTS

| | | |
|---|---|---|
| 1,703,803 | Widstrom | Feb. 26, 1929 |
| 2,115,502 | Vernet | Apr. 26, 1938 |
| 2,220,777 | Othmer | Nov. 5, 1940 |
| 2,289,425 | Hogan | July 14, 1942 |
| 2,808,494 | Telkes | Oct. 1, 1957 |
| 2,942,051 | Roeder | June 21, 1960 |

FOREIGN PATENTS

| | | |
|---|---|---|
| 492,724 | Great Britain | Sept. 26, 1938 |